United States Patent Office.

JOHN ROGERS AND LAWRENCE REID, OF BROOKLYN, NEW YORK.

Letters Patent No. 105,254, dated July 12, 1870.

IMPROVEMENT IN REFINING SUGAR.

The Schedule referred to in these Letters Patent and making part of the same.

*To whom it may concern:*

Be it known that we, JOHN ROGERS and LAWRENCE REID, both of Brooklyn, Kings county, State of New York, have invented a new and improved System of Sugar Refining; and we hereby declare that the following is a full and exact description thereof.

Our invention relates to an improved mode of refining sirups and sugars, in order to a full understanding of which, it may be proper to give a brief statement of some of the principal difficulties to be overcome by the sugar-refiner, that he may conduct his operations to an economical and successful issue.

The first, and possibly the greatest of these difficulties, arises from the imperfect means hitherto used for the prevention of the formation of grape-sugar, which not only impairs the quality of the sugar, but otherwise results in a heavy loss to the refiner, excessive heat applied in the defecating process being a prime cause. Another evil to be overcome consists in an imperfect crystallization and decoloration of the sugar, also resulting, in a measure, from overheat in contact with air, and from the presence of organic and inorganic impurities, the means hitherto used for their removal being insufficient for the purpose, especially for the thorough elimination of the free lime from the sirup, whether originally contained therein, or as added during the defecating process.

To remedy these and kindred difficulties is the object of our invention, and its nature consists—

First, of a new and improved mode of conducting the defecating process of the sirup or sugar to be refined; and Secondly, of a new and improved mode of treating the defecated sirup, and of conducting the final separation of the sirup from all impurities of whatever kind in the bone-black vat.

The defecating process or "blow-up," as it is technically called, consists—

First, in conducting the process in a vacuum "blow-up," that is to say, by boiling the sirup in vacuum, whereby the temperature is retained below that temperature at which grape-sugar is formed, or at least most rapidly formed; and in the absence of atmospheric air which greatly facilitates its formation, and otherwise impairs the quality of the sugar; and Secondly, our improved defecating-process consists in mixing with the sirup or solution of sugar to be refined certain chemical and mechanical adjuncts for purifying the same.

Our improved process for completing the decoloration and final separation of the purified sirup or solution of sugar from the impurities still contained in it after defecation, consists—

First, in conducting the process in a vacuum-vat or filter, whereby the more perfect separation of impurities is insured, (the free lime being entirely neutralized and absorbed,) and a more perfect decoloration effected, from the fact that a more perfect contact of the sirup with the bone-black is brought about; and Secondly, in the chemical means used for neutralizing, precipitating, and separating the free lime, coloring matter, and other impurities from the sirup in the bone-black vat, in which connection we may here state that we do not confine our invention, so far as relates to the chemicals used for the defecting process, and to those used for the ultimate purifying and decoloring process, to use in vacuum blow-ups or vacuum bone-black vats or filters; on the contrary, we hold them as our discovery, when used in the manner and for the purposes described hereafter, whether in open, closed, or vacuum vessels. Moreover, we are aware that a preparation has been described as having been used, or been intended to be used, for purifying defecated beet-juice, consisting of a subphosphate of lime formed by the addition of superphosphate of lime to powdered animal charcoal; this preparation, we desire to state, forms no part of our improved process, and hence make no claim to it whatever. And so with vacuum-pans for the final evaporation of the sugar, and vacuum-vats for the straining of the sugar while crystallizing in the molds. We make no claim to either.

Hence, to enable others skilled in the art to distinguish from others, and to fully understand and use our invention, we shall proceed to detail the operations as conducted by us, and which gave our best results.

For the purpose of making the blow-up or solution of sugar, we place the sugar intended to be operated on in a suitable vessel, (we would prefer a wooden tank;) we then scald it with a sufficiency of boiling water, regulating the quantity according to the density of the sirup we wish to work with; we would prefer a strength of 27° of Beaumé, but higher density may be worked, and lower, with still more advantage as regards color, in our experience; having scalded our sugar and obtained solution of it by the use of oars, a clash-wheel, or other suitable mechanical arrangement, we add, as finings, either a solution of lime in water, a clear solution of that substance, or milk of lime, as usual. Should we use the clear solution of lime, the quantity which we would recommend is about twenty gallons of that liquid to one thousand pounds of sugar; but the quantity that may be employed advantageously will depend much on the quality of the sugar used.

To the mixture of lime-water and sugar is then added a sufficiency of the solution of the superphosphate of lime to neutralize the lime used, a test litmus paper being used to denote the point of neutralization; should the milk of lime be used, it is also treated in the same manner with a solution of the superphosphate of lime. We prefer the clear solution of lime-water, because with it we run much less risk of injuring the color of the sugar than by the causticity of the crude slacked lime in the milk of lime. With this solution of sugar, thus prepared, we might charge our vessel to be used as our vacuum blow-up, and in some cases would proceed to perform that operation, but from the nature of crude sugars differing much, and also to further improve the color of the sirup from the blow-up, and likewise to enable the operators to better squeeze out the sediment that remains in the bags after filtering the solution of sugar from the blow-up, we prefer to use a portion of coagulated blood in connection with the lime and superphosphate of lime, the method of preparing which is as follows:

For one thousand pounds of sugar, we would take five quarts of blood, mixed with four and one-half ounces of lamp-black, which had been previously calcined, five ounces of a solution of the superphosphate of lime, and three gallons of water; place the whole in an enameled pot or copper vessel, and bring the whole to a brisk boil for one-half minute; then strain off the water through a tin colander, or still better, a hair-cloth sieve; then mix well the coagulum with about two gallons of the solution of sugar prepared as described, in a pail; having done which throw all into the rest of the sirup, fine bone-black, pounded chalk, or clay, though in a greater quantity than the lamp-black—about five times as much of these substances—might be used to divide the coagulum of blood, but we prefer lamp-black because of the better results we have had with that substance; the water is also useful in dividing the blood, and the superphosphate of lime insures us against an alkaline state of that fluid, and assists in its coagulation; also the straining off the water from the coagulum withdraws the greater part of the saline matters contained in the blood, well known from their nature to be injurious to the crystallization of the sugar.

In this manner, then, we consider that the benefit of a blood coagulum is a sugar blow-up is obtained without the high temperature necessary to coagulate the albumen of the blood, and which temperature is not attained in our vacuum blow-up; and though we would scarce expect so good a result from adding a coagulum of blood to sirup, as what we obtain by coagulating the blood in the sirup, still the very superior result settles the value of the process.

In using the clear lime-water, account must be taken of the state of dilution it will produce in the sirup, and less water should proportionately be used in the scald; the quantity of milk of lime is used in such proportion as will suit the views of the operator.

Being now ready for our vacuum blow-up, we run or pump the sirup so prepared into any suitable vessel of a strength sufficient to bear the pressure of the atmosphere, and so constructed as to be capable of having the air within it that is superincumbent above the liquid exhausted; also capable of having heat applied to the fluid contained within by steam-pipes applied at the bottom, or what we much prefer, a mere false bottom heated with hot water about 200°, which is near the boiling-heat, and will be found sufficient for the purpose; the sirup being already at a heat of about 120° from the boiling water used in the scald, little additional heat will be necessary to bring the blow-up to a boil when the exhaust-pumps are applied; a temperature of 140° to 170° is sufficient, the lower the better, and that for a time of about ten minutes will, in our experience, be sufficient; the sirup may be then discharged from the vacuum blow-up, and from hence run into the usual bag-filter, and that part of the operation is now completed. The exhaust apparatus is now ready for another vacuum blow-up, and, in our opinion, the whole operation from the time of scalding the sugar till the time of allowing the vacuum blow-up to run into the bags, need not consume more than an hour.

We may here be allowed to state what we consider the peculiar advantages of the vacuum blow-up; time has already established the value of Howard's vacuum process for the evaporation of sirups, and this, we hold, is but following up the principle of that process; a solution of pure loaf-sugar is known to become rapidly deteriorated when heated, and the formation of grape or uncrystallizable sugar is known to result from the heat, the higher the temperature the greater the deterioration of the sirup. We consider the scald of the sugar sufficient to destroy any organic life, either vegetable or animal, in the raw sugar, and that by the vacuum blow-up we obtain all the advantages of the thorough defecation of the sirup by its ebullition, without any of the disadvantages of a high temperature; and we know, further, in proof of what we assert, that our vacuum process does not increase the quantity of grape-sugar in the sirup operated on, while the open blow-up does so to a most serious extent; also, a marked difference is to be ascribed, as in the open blow-up, where the impurities existing in the sugar are boiled in, as it were, into the sirup under the atmospheric pressure and corresponding temperature, to a process at a low temperature, and in vacuum, the improved color of the latter blow-up will be sufficient proof of the fact; the comparative pure taste of the sirup resulting from the vacuum blow-up is also another evidence of the value of the process. In three ways, then, we very decidedly prove the advantages of the vacuum blow-up: first, by chemical tests of the sirup so prepared; second, by color; and third, by taste of the sirup.

Having passed the sirup from the vacuum blow-up through the usual bag-filters, we will now proceed to describe the bone-black vacuum apparatus or vat, and our method of operating it:

Into a vessel capable of bearing atmospheric pressure, and of being exhausted of its gaseous contents, we charge through a man-hole a sufficiency of bone-black—we prefer to charge it within two feet of the top with that substance; we then close the man-hole and run in the sirup through a stop-cock; we prefer to charge the vessel so as to cover the bone-black to about ten inches. Having closed the stop-cock, we apply the exhaust-pumps and withdraw the air from the vat and the bone-black, when the sirup will be found much to mix more intimately with the bone-black in consequence of its air being withdrawn; a less time and a greater discharge of color and taste are the results; though, as in ordinary working of bone-black vats, these results are much improved by allowing the sirup to remain longer on the black.

We have here described the working of our exhausted bone-black vat without these adjuncts that very much increase the value of this process to sugar-houses; we now proceed to describe the working of the apparatus with a chemical adjunct, the solution of the superphosphate of lime, to assist the action of the bone-black and enable us to work the black for eight or nine times in succession without reburning or even removing it from the vat: for this purpose we add to every thousand pounds of the sugar contained in the sirup placed in the vat three gallons of the solution of the superphosphate of lime, and then proceed, as before, to exhaust the vat of the atmospheric air, and then allow all to stand, as before, for about twelve hours; the sirup will then be found in a fit condition for the evaporating-pan. Having discharged the vat, we recharge with sirup, using a similar quantity of superphosphate of lime, as before, exhaust the air again, and allow the sirup to remain on the black for another twelve hours; discharge and recharge, as before, and repeat for eight or nine times, when it may be necessary to wash out the black with water, discharge the vat, and reburn the bone-black. The same process may be performed with our patent bone-black when about one half of the solution of superphosphate of lime will be sufficient to effect the object.

Another mode of working the vacuum bone-black vat consists in charging the vat with black, as before, then applying the exhaust-pumps to withdraw the air from the vat and bone-black. When the exhaust is sufficient, the stop-cock admitting the sirup into the vat is opened, when the pressure of the atmosphere will force the sirup into the vat and into the black to supply the vacuum; though this mode of working the bone-black vacuum vat may not be considered so convenient as that previously detailed, still, as better results were had from this mode of operating, we bring it forward.

It is believed that by the vacuum part of the process the power of the bone-black is very much increased, by having the air withdrawn from surface and interior, and that an actual contact of the bone-black with the sirup takes place in consequence; hence the powerful action of that substance in absorbing the impurities existing in the sirup.

The vessel containing the bone-black and sirup being air-tight, an additional power can be had to act on the sirup and bone-black by merely reversing the valves of the exhaust-pump and converting its action into that of a force-pump, and forcing a sufficiency of air into the vessel to give a pressure of an atmosphere, or what may be requisite on the surface of the black. This power can also be used very advantageously in discharging the vat of sirup.

Should we make a chemical examination of the sirup as it comes from the bag-filters, we will at once be struck with the large quantity of lime present, and see a good and sufficient reason for the use of the solution of the superphosphate of lime as recommended by us, and the sirup which results from our vacuum bone-black vat, combined with the use of superphosphate of lime, will be found very much more free from lime than that sirup that has merely been passed through bone-black, and hence more fit for crystallization and the manufacture of pure sugar.

We will here proceed to detail our method of preparing the solution of superphosphate of lime, and also the clear solution of lime in water.

The solution of superphosphate of lime is prepared by placing in a cask capable of containing one hundred gallons, seventy-five pounds of oil of vitriol, previously mixed with thirty gallons of water, and adding by degrees to this mixture one hundred pounds of bone-black or burned bone, in fine powder. This operation should take about twelve hours, during which time it should be well stirred at each addition of the black, then fill up the cask with water, mixing all well together; in twelve more hours the sediment, which is large, will have subsided considerably; the clear solution is the solution of superphosphate of lime.

To make the solution of clear lime-water, take a cask capable of containing one hundred gallons of water; fill it nearly full of soft water; add to this four pounds of lime which has been freshly slaked in a pail with three gallons of water; mix it well in the pail, and then throw it into the cask of water, mixing all well. The clear lime-water will be ready for use in about twelve hours, and may be drawn from the cask by a stop-cock placed about one third from the bottom. The clear lime-water should be kept covered up from the air, as this substance speedily carbonates it, rendering it inert.

Having concluded the description of the process as contained in our new system of sugar-refining, we may now enumerate what we believe to be the particular advantages of this mode of operating:

First, the avoidance of any increase of grape or uncrystallizable sugar in the sugar operated on.

Secondly, the great improvements in the discharge of color and taste of the sirups from the vacuum blow-up and the vacuum bone-black vat.

Thirdly, the further impovement in the production of sirups of a better quality and taste, by the use of the coagulated blood, lamp-black, superphosphate of lime, and clear lime-water in the blow-up.

Fourthly, the great saving of labor and bone-black by the continuous working of the bone-black vat by the aid of a solution of superphosphate of lime.

Fifthly, the better quality of sirup resulting from the use of the vacuum bone-black vat and super-phosphate of lime, its freeness from lime proving it much more fit for for the manufacture of pure sugar than the sirups now made in the sugar-refineries.

Sixthly, as a necessary consequence, the superior quality of the sugar-house sirup or molasses obtained by this plan of operations is very marked.

What we claim as new, and desire to secure by Letters Patent, is—

1. Conducting the "blow-up" or defecating process in a vessel so constructed and operated as to boil the sirup or solution of sugar in vacuum for the purposes set forth.

2. Treating sirups or solutions of sugar to be defected with clear lime-water, or milk of lime, and a solution of superphosphate of lime, the whole being then subjected to the action of heat, or boiled, for the purposes described.

3. Treating sirups or solutions of sugar to be defecated with clear lime-water, or milk of lime, superphosphate of lime, and a coagulum of blood prepared in the manner described, the whole being then boiled or subjected to the action of heat for the purposes set forth.

4. Treating sirups or solutions of sugar to be defecated before boiling with a coagulum of blood, prepared in the manner substantially as and for the purposes set forth.

5. Conducting the final separation of impurities and decoloration of the sirup or sugar solutions in a vacuum bone-black vat or filter, operated in the manner and for the purposes set forth.

6. Treating the defecated sirup or sugar solution with a solution of superphosphate of lime when used in connection with a bone-black vat or filter either with or without vacuum, whereby the operator is enabled to work the vat continuously for a number of charges without removing or reburning the black, and whereby a more thorough elimination of the lime and other impurities from the sirup, &c., is effected, as set forth.

7. The combination of the improved processes, as above described, for the purposes set forth.

JOHN ROGERS.
LAWRENCE REID.

Witnesses:
  G. D. S. TRASK,
  P. S. SMITH.